United States Patent Office 3,466,255
Patented Sept. 9, 1969

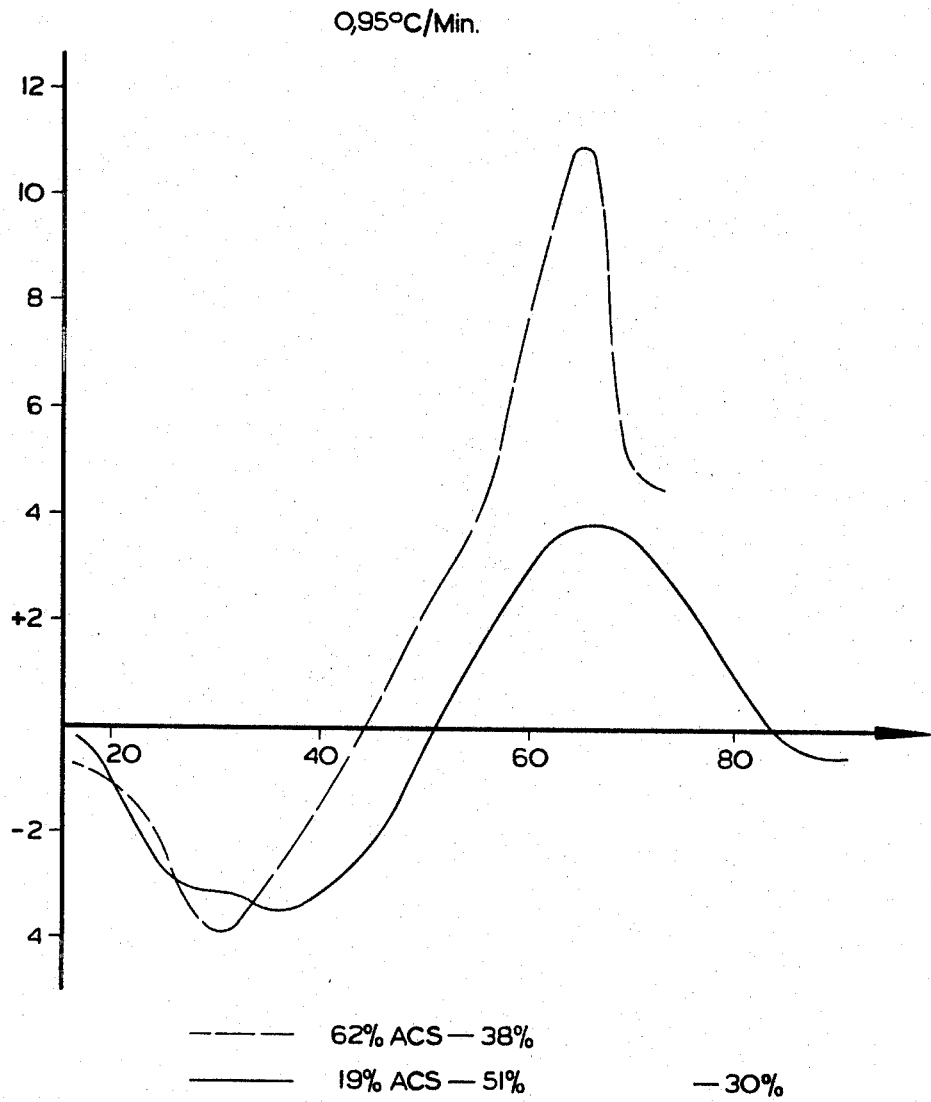

3,466,255
POLYMERIZATION CATALYSTS CONTAINING AN ACYLCYCLOALKANE SULFONYL PEROXIDE, FATTY ACID AND WATER
Gerhard Faerber and Wilhelm Kersken, Rhineberg, Germany, assignors to Deutsche Solvay-Werke G.m.b.H., Solingen-Ohligs, Germany, a company of Germany
Filed Feb. 28, 1966, Ser. No. 530,466
Claims priority, application Germany, Mar. 2, 1965, D 46,644
Int. Cl. C08f 1/60
U.S. Cl. 260—23        10 Claims

ABSTRACT OF THE DISCLOSURE

The preparation of polymers and co-polymers from addition polymerizable unsaturated monomeric compounds using acylcycloalkane sulphonyl peroxides as catalysts, characterized in that a catalyst is used which comprises 30 to 70% by weight of at least one higher fatty acid having 7 to 13 carbon atoms, at least one acylcycloalkane sulphonyl peroxide and water. These catalysts exhibit reduced explosiveness.

---

The polymerization of unsaturated compounds with an acylcycloalkene sulphonyl peroxide as catalyst, for example, acetylcyclohexane sulphonyl peroxide, is known. Acetylcyclohexane sulphonyl peroxide is advantageously used in the polymerization of unsaturated compounds because a considerable shortening of the polymerization period is produced.

Handling these peroxides, however, is relatively dangerous. The explosiveness of dry acetylcyclohexane sulphonyl peroxide amounts to only 0.2 m.kg, and of mercury fulminate to only 0.08 m.kg. The explosion resembles that of a priming explosive, having only gaseous decomposition products. Desensitization of the acetylcyclohexane sulphonyl peroxide with 30 to 35% by weight of water is in many cases insufficient, since it still explodes at 1.5 m.kg. Desensitization of the peroxide with water has the disadvantage that a homogeneous mixture cannot be produced. For this reason it is not possible to further reduce the explosiveness by mixing relatively large amounts of water with the peroxide. The same behaviour is shown by acetylcyclopentane sulphonyl peroxide, which has not previously been described in the literature.

It has a half-life which is similar to that of acetylcyclohexane sulphonyl peroxide and, in contrast to acetylcyclohexane sulphonyl peroxide, remains liquid even at low temperatures. The choice of desensitizing agents for the peroxides is restricted. In alcohols, for example methanol, decomposition results, and in esters, for example dioctyl phthalate, side reactions occur. Desensitization with aromatic hydrocarbons is known, but since they remain in the polymer, these are undesirable in many cases and even in some cases not permitted.

Lower carboxylic acids such as acetic acid cause inhibition of the polymerization.

The object of the present invention is to eliminate the disadvantages described and to form a catalyst for a polymerization process in which no inhibition occurs in spite of desensitization of the explosive catalytic substance.

It has been found that mixtures of at least one acylcycloalkane sulphonyl peroxide, at least one fatty acid having 7 to 13 carbon atoms and water are safe catalysts, which do not have the above-mentioned disadvantages. These catalysts do not inhibit polymerization and do not have the great sensitivity to explosion of the acylcycloalkyl sulphonyl peroxides. Examples of fatty acids which may be used in this invention are lauric acid, capric acid and enanthic acid. Although the polymerization activity of the catalyst is not reduced, the desensitization by the fatty acid is surprisingly effective. A mixture of, for example, 30% by weight of acetylcyclohexane sulphonyl peroxide, 55% by weight of lauric acid and 15% by weight of water is finely powdered and dry and has a good flow and can therefore be easily and safely handled. Its explosiveness is above 2.5 m.kg. A sample of a few grams of the mixture dropped onto an ignited strip of paper causes the flame to be extinguished without fuming-off. In the hot flame moderately quick evaporation takes place, also without fuming-off. The measurement of the energy of decomposition by differential thermo-analysis shows, as is shown in the accompanying drawing, a later start to the reaction and a moderate course of reaction, as compared with the peroxide only desensitized with water.

The preparation of a catalyst mixture according to the invention is effected, for example, by melting the fatty acid or preferably a mixture of fatty acids, and adding a peroxide desensitized with water to the melt until the desired concentration is reached. It is also possible to mix in water liquid peroxide or molten peroxide and liquid or molten fatty acid or fatty acid mixtures. The preparation of a catalyst mixture is suitably effected in the presence of a dispersing agent such as partly hydrolyzed polyvinyl acetate.

By further drying of the mixture, the quantity of water may be adjusted so that a product having a high-flow is formed.

The use of the acylcycloalkane sulphonyl peroxides desensitized according to the invention for the polymerization of unsaturated compounds is carried out alone or together with one of the usual radical catalysts, such as benzoyl peroxide, lauroyl peroxide or azoisobutyronitrile.

The invention is further illustrated by, but is in no manner limited to, the following examples.

EXAMPLE I

This example shows the preparation of desensitized acetylcyclohexane sulphonyl peroxide. A solution of 1.15 g. of partly hydrolyzed polyvinyl acetate, which serves as dispersing agent, in 1000 g. of water is heated to 44° C. and 494 g. of lauric acid and 45 g. of capric acid are added until they are all melted. The solution is then cooled to 35° C. and 392 g. of acetylcyclohexane sulphonyl peroxide with a water content of about 35% by weight are added portionwise. The mixture is then discharged at 34° C. into a solution of 0.5 g. of partly hydrolyzed polyvinyl acetate in 1000 g. of water and 600 g. of ice cubes. The product is filtered off by suction and a solid homogeneous mass containing 22% by weight of acetylcyclohexane sulphonyl peroxide is obtained which is completely safe to handle.

EXAMPLE 2

This example shows the use of conventional disensitized catalysts for polymerization, and is included for comparison purposes.

A 3-litre stainless steel autoclave is filled with a solution of 2.2 g. of partly hydrolysed polyvinyl acetate and 1550 g. of water. After adding 0.8 g. of acetylcyclohexane sulphonyl peroxide desensitized with water (35% by weight $H_2O$) the autoclave is closed and the oxygen of the air is removed by evacuation and replacement by nitrogen under pressure. Then 1000 g. of vinyl chloride are added, the stirrer is started and the autoclave is heated to 54° C. A drop in pressure takes place after 4 hours, and the whole reaction lasts about 5.5 hours.

The following examples show the polymerization process according to the invention using a catalyst desensitized with fatty acids.

EXAMPLE 3

When a mixture of 0.52 g. of acetylcyclohexane sulphonyl peroxide, 0.75 g. of lauric acid and 0.45 g. of water is used in the process described in Example 2 instead of the mixture of 0.52 g. of acetylcyclohexane sulphonyl peroxide and 0.28 g. of water, the drop in pressure also takes place after 4 hours and the reaction is complete after about 5.5 hours.

EXAMPLE 4

A solution of 500 g. of demineralized water and 1 g. of partly hydrolyzed polyvinyl acetate is placed in a pressure vessel, as well as 3 g. of a mixture consisting of equal parts of acetylcyclopentane sulphonyl peroxide, lauric acid and water. The vessel is closed and the oxygen of the air removed. Then a mixture of 136 g. of vinylidine chloride and 64 g. of isooctyl acrylate is added under pressure and the stirrer is started. The temperature is then raised to 50° C. The polymerization is completed after 6 hours, and the yield is substantially quantitative.

EXAMPLE 5

A solution of 1700 g. of water and 5 g. of partly hydrolyzed polyvinyl acetate and 75 g. of isooctyl acrylate is placed in a 3-litre refined steel autoclave. After addition of 0.75 g. of a mixture of 35% by weight of acetylcyclohexane sulphonyl peroxide, 5% by weight of water and 60% by weight of a mixture of lauric acid and enanthic acid, the autoclave is closed and the oxygen of the air removed. Then 425 g. of vinyl chloride are put in under pressure and stirring is started. The reaction temperature measured was 55° C. The drop in pressure took place after 3.5 hours, and the reaction was completed after 4 hours.

EXAMPLE 6

When only 0.50 g. of the mixture of acetylcyclohexane sulphonyl peroxide, fatty acids and water is used in Example 5 instead of 0.75 g., and 1 g. of lauroyl peroxide is also added, the total time of the experiment is reduced to 3.75 hours, since the drop in pressure is accelerated.

We claim:
1. Process for the preparation of polymers and copolymers from addition polymerizable unsaturated monomeric compounds using acylcycloalkane sulphonyl peroxides as catalysts in an aqueous medium, characterized in that a catalyst is used which comprises 30 to 70% by weight of at least one higher fatty acid having 7 to 13 carbon atoms, 5 to 49% by weight of at least one acylcycloalkane sulphonyl peroxide and 0.5 to 35% by weight of water.

2. Process according to claim 1, characterized in that another free radical generating catalyst is used at the same time.

3. The process of claim 1 wherein the acylcycloalkane sulphonyl peroxide is acetylcyclohexane sulphonyl peroxide.

4. The process of claim 1 wherein the fatty acid is lauric acid.

5. The process of claim 1 wherein the fatty acid is a mixture of lauric acid and capric acid.

6. A process of claim 1 for polymerizing monomers selected from the group consisting of vinyl chloride, vinylidene chloride and isooctyl acrylate in the presence of a catalyst comprising:
(A) 5 to 49% by weight of a peroxide selected from the group consisting of acetylcyclohexane sulfonyl peroxide and acetylcyclopentane sulfonyl peroxide;
(B) 30 to 70% by weight of at least one higher fatty acid having 7 to 13 carbon atoms; and
(C) 0.5 to 35% by weight of water.

7. A process of claim 1 for polymerizing monomers selected from the group consisting of vinyl chloride, vinylidene chloride and isooctyl acrylate in an aqueous medium and an oxygen free atmosphere at 50 to 55° C. in the presence of a catalyst consisting essentially of:
(A) 5 to 49% by weight of a peroxide selected from the group consisting of acetylcyclohexane sulfonyl peroxide and acetylcyclopentane sulfonyl peroxide;
(B) 30 to 70% by weight of at least one higher fatty acid having 7 to 13 carbon atoms;
(C) 0.5 to 35% by weight of water; and
(D) a minor amount of partially hydrolyzed polyvinyl acetate wherein the ratio of catalyst to monomer is 0.15:100 to 1.50:100.

8. An addition polymerization catalyst comprising:
(A) 5 to 49% by weight of acylcycloalkane sulphonyl peroxide;
(B) 30 to 70% by weight of at least one fatty acid containing 7 to 13 carbon atoms; and
(C) 0.5 to 35% by weight of water.

9. An addition polymerization catalyst of claim 8 comprising:
(A) 5 to 49% by weight of a peroxide selected from the group consisting of acetylcyclohexane sulfonyl peroxide and acetylcyclopentane sulfonyl peroxide;
(B) 30 to 70% by weight of at least one higher fatty acid having 7 to 13 carbon atoms; and
(C) 0.5 to 35% by weight of water.

10. An addition polymerization catalyst of claim 8 consisting essentially of:
(A) 5 to 49% by weight of a peroxide selected from the group consisting of acetylcyclohexane sulfonyl peroxide and acetylcyclopentane sulfonyl peroxide;
(B) 30 to 70% by weight of at least one higher fatty acid having 7 to 13 carbon atoms;
(C) 0.5 to 35% by weight of water; and
(D) a minor amount of partially hydrolyzed polyvinyl acetate.

References Cited
UNITED STATES PATENTS

| | | | |
|---|---|---|---|
| 3,330,871 | 7/1967 | Mageli et al. | 260—610 |
| 2,975,162 | 3/1961 | Iloff | 260—85.7 |
| 3,022,282 | 2/1962 | Marous et al. | 260—92.8 |
| 3,205,204 | 9/1965 | Heckmaier et al. | 260—87.1 |
| 3,260,711 | 7/1966 | Christen et al. | 260—92.8 |
| 3,293,199 | 12/1966 | Abercrombie | 260—17 |
| 3,340,243 | 9/1967 | Beer et al. | 260—92.8 |

DONALD E. CZAJA, Primary Examiner

R. A. WHITE, Assistant Examiner

U.S. Cl. X.R.

260—29.6, 86.3, 89.5, 92.8, 610, 80.3